US008643541B2

(12) United States Patent
Van Diggelen et al.

(10) Patent No.: US 8,643,541 B2
(45) Date of Patent: Feb. 4, 2014

(54) METHOD AND APPARATUS FOR ENHANCED AUTONOMOUS GPS

(75) Inventors: Frank Van Diggelen, San Jose, CA (US); Sergei Podshivalov, San Jose, CA (US); Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 31 days.

(21) Appl. No.: 13/418,060

(22) Filed: Mar. 12, 2012

(65) Prior Publication Data

US 2012/0229335 A1  Sep. 13, 2012

Related U.S. Application Data

(63) Continuation of application No. 12/544,614, filed on Aug. 20, 2009, now Pat. No. 8,134,500, which is a continuation of application No. 11/057,060, filed on Feb. 11, 2005, now Pat. No. 7,595,752, which is a continuation-in-part of application No. 10/674,267, filed on Sep. 29, 2003, now Pat. No. 7,158,080.

(60) Provisional application No. 60/415,364, filed on Oct. 2, 2002.

(51) Int. Cl.
*G01S 19/05* (2010.01)
*G01S 19/42* (2010.01)

(52) U.S. Cl.
USPC ................................ 342/357.42; 342/357.25

(58) Field of Classification Search
USPC ............. 342/357.21, 357.25, 357.42, 357.63, 342/357.71; 701/468, 469
See application file for complete search history.

(56) References Cited

U.S. PATENT DOCUMENTS

| 4,445,118 A | 4/1984 | Taylor et al. |
| 4,894,662 A | 1/1990 | Counselman |
| 5,119,504 A | 6/1992 | Durboraw, III |
| 5,225,842 A | 7/1993 | Brown et al. |
| 5,365,450 A | 11/1994 | Schuchman et al. |
| 5,430,657 A | 7/1995 | Kyrtsos |

(Continued)

FOREIGN PATENT DOCUMENTS

| EP | 1 197761 A2 | 4/2002 |
| WO | WO 99/19743 A1 | 4/1999 |

(Continued)

OTHER PUBLICATIONS

Aparicio et al., "GPS Satellite and Payload," Global Positioning System: Theory and Applications vol. I, Progress in Astronautics and Aeronautics, vol. 163, Ch. 6, 1996, 35 pages.

(Continued)

*Primary Examiner* — Dao Phan
(74) *Attorney, Agent, or Firm* — Sterne, Kessler, Goldstein & Fox PLLC

(57) ABSTRACT

A method and apparatus for determining a location of a remote receiver is described. The remote receiver receives satellite tracking data from a server, which it stores in memory. This satellite tracking data has a predetermined validity time period associated with it. When a connection cannot be established between the remote receiver and the server and the predetermine validity time period of the satellite tracking data has expired, the remote receiver calculates acquisition assistance data using the expired satellite tracking data for use with obtaining ephemeris data from a satellite. The remote receiver then calculates its position using the receiver ephemeris data.

20 Claims, 13 Drawing Sheets

(56) References Cited

U.S. PATENT DOCUMENTS

| | | | |
|---|---|---|---|
| 5,673,256 | A | 9/1997 | Maine |
| 5,726,893 | A | 3/1998 | Schuchman et al. |
| 5,841,396 | A | 11/1998 | Krasner |
| 5,889,492 | A | 3/1999 | Kurby et al. |
| 5,917,444 | A | 6/1999 | Loomis et al. |
| 6,064,336 | A | 5/2000 | Krasner |
| 6,067,045 | A | 5/2000 | Castelloe et al. |
| 6,134,483 | A | 10/2000 | Vayanos et al. |
| 6,211,819 | B1 | 4/2001 | King et al. |
| 6,215,441 | B1 | 4/2001 | Moeglein et al. |
| 6,222,483 | B1 | 4/2001 | Twitchell et al. |
| 6,256,475 | B1 | 7/2001 | Vannucci |
| RE37,408 | E | 10/2001 | Loomis et al. |
| 6,411,254 | B1 | 6/2002 | Moeglein et al. |
| 6,411,892 | B1 | 6/2002 | van Diggelen |
| 6,453,237 | B1 | 9/2002 | Fuchs et al. |
| 6,542,820 | B2 | 4/2003 | LaMance et al. |
| 6,560,534 | B2 | 5/2003 | Abraham et al. |
| 6,636,740 | B1 | 10/2003 | Ramesh |
| 6,642,884 | B2 | 11/2003 | Bryant et al. |
| 6,734,821 | B2 | 5/2004 | van Diggelen |
| 6,829,535 | B2 | 12/2004 | van Diggelen et al. |
| 6,856,282 | B2 | 2/2005 | Mauro et al. |
| 7,158,080 | B2 | 1/2007 | van Diggelen |
| 7,595,752 | B2 | 9/2009 | van Diggelen et al. |
| 8,134,500 | B2 | 3/2012 | van Diggelen et al. |
| 2002/0024461 | A1 | 2/2002 | Moeglein et al. |
| 2003/0023379 | A1 | 1/2003 | Diggelen et al. |
| 2004/0203853 | A1 | 10/2004 | Sheynblat |
| 2005/0003833 | A1 | 1/2005 | Younis |

FOREIGN PATENT DOCUMENTS

| | | |
|---|---|---|
| WO | WO 00/58750 A1 | 10/1999 |
| WO | WO 99/53338 A2 | 10/1999 |
| WO | WO 02/103383 A2 | 12/2002 |
| WO | WO 03/010912 A2 | 2/2003 |

OTHER PUBLICATIONS

Bertiger et al., "GPS precise tracking of TOPEX/POSEIDON: Results and Implications," Journal of Geophysical Research, vol. 99, No. C12, pp. 24,449-24,464, Dec. 15, 1994, 16 pages.

Bertiger et al., "GPS precise tracking of Topex/Poseidon: Results and Implications," Submitted for Publication to JGR TOPEX/Poseidon Special Issue, http:l/hdl.handle.net/2014/33763, Nov. 1993, 70 pages.

Chansarkar et al., "Acquisition of GPS Signals at Very Low Signal to Noise Ratio," ION NTM 2000, Anaheim, CA, Jan. 26-28, 2000, 7 pages.

European Patent Office Action in European Patent Application No. 03 799 351.6-2220, dated Aug. 18, 2005, 6 pages.

European Patent Office Action in European Patent Application No. 03 799 351.6-2220, Dated Apr. 17, 2007, 6 pages.

International Search Report for International Patent Application No. PCT/US03/30872, mailed Mar. 17, 2004, 4 pages.

International Search Report for International Patent Application No. PCT/US06/04422, mailed May 15, 2006, 1 page.

Response to European Patent Office Action mailed on Apr. 17, 2007 in European Application No. 03 799 351.6-2220, dated Aug. 5, 2007, 4 pages.

DiEsposti et al., "Of Mutual Benefit: Merging GPS and Wireless Communications," GPS World, vol. 9, No. 4, Apr. 1998, 7 pages.

DiEsposti et al., "The Benefits of Integrating GPS, INS and PCS," The Aerospace Corp., ION-GPS-98, 2 Session D1, Receiver Systems and Technology 1: New Receiver Architectures & Signal Processing Strategies, Nashville Convention Center, Nashville, Tennessee, Sep. 15-18, 1998, 5 pages.

Enge et al., "Wide Area Augmentation System," Global Positioning System: Theory and Applications vol. II, Progress in Astronautics and Aeronautics, vol. 164, Ch. 4, 1995, 29 pages.

Expert Report of Stephen Heppe, dated Feb. 25, 2008, Regarding Invalidity of U.S. Patent Nos. 6,417,801, 6,606,346, 6,651,000, 6,704,651, 6,937,187, and 7,158,080, United States International Trade Commission Investigation No. 337-TA-602, Certain GPS Devices and Products Containing Same, 390 pages.

Fifth Supplemental Objections and Responses dated Apr. 3, 2008, by Respondents Mio Technology Limited, USA et al., to Global Locate, Inc.'s First Set of Interrogatories (Nos. 19, 21-23 and 27-28), United States International Trade Commission Investigation No. 337-TA-602, Certain GPS Devices and Products Containing Same, 2 pages.

File History of U.S. Appl. No. 10/081,164, filed Feb. 22, 2002 (now Abandoned), 218 pages.

First Amended Complaint by the Complainants, dated Feb. 8, 2008, under section 337 of the Tariff Act of 1930, as Amended, United States International Trade Commission Investigation NO. 337-TA-602, Certain GPS 45 Devices and Products Containing Same, 2 pages.

First Supplemental Corrected Notice of Prior Art by the Repsondents, dated Mar. 4, 2008, United States International Trade Commission Investigation No. 337-TA-602, Certain GPS Devices and Products Containing Same, 2 pages.

First Supplemental Objections and Responses dated Aug. 24, 2007, by Respondent SiRF Technology, Inc., to Global Locate, Inc's First Set of Interrogatories (Nos. 22, 23 and 49) and Exhibits 23-27, United States International Trade Commission Investigation No. 337-TA-602, Certain GPS Devices and Products Containing Same, 34 pages.

First Supplemental Report of Dr. Stephen Heppe, dated Apr. 14, 2008, Regarding Invalidity of U.S. Patent Nos. 6,417,801, 6,606,346, 6,937,187 and 7,158,080, United States International Trade Commission Investigation No. 337-TA-602, Certain GPS Devices and Products Containing Same, 6 pages.

Francisco, "GPS Operational Control Segment," Global Positioning System: Theory and Applications, Ch. 10, 1994, 32 pages.

Garin et al., "Wireless Assisted GPS-SiRF Architecture and Field Test Results," ION GPS '99, Nashville, TN, Sep. 14-17, 1999, 9 pages.

Hugentobler et al., "CODE IGS Analysis Center Technical Report 2000", International GPS Service for Geodynamics, 2000 Technical Reports, IGS Central Bureau, Jet Propulsion Laboratory, California Institute for Technology, Pasadena, CA, Nov. 2001, 76 pages.

Initial Determination by Administrative Law Judge Carl C. Charneski, dated Nov. 25, 2008, Public Version, United States International Trade Commission Investigation No. 337-TA-602, Certain GPS Devices and Products Containing Same, 221 pages.

LaMance et al., "Assisted GPS—Low Infrastructure Approach," GPS World, vol. 13, No. 3, Mar. 2002, 8 pages.

Melbourne et al., "Scientific Applications of GPS on Low Earth Orbiters," Jet Propulsion Laboratory, California Institute of Technology, Pasadena, CA, 1994, 26 pages.

Mueller et al., "1997 Technical Reports," International GPS Services for Geodynamics (IGS), IGS Central Bureau, Jet Propulsion Laboratory, California Institute of Technology, Pasadena, CA, Oct. 1998, 296 pages.

NAVSTAR GPS Space Segment / Navigation User Interfaces, ICD-GPS-200, Jul. 3, 1991, 145 pages.

NAVSTAR GPS, ICD-GPS-200, Revision C, Oct. 10, 1993, Oct. 13, 1995, Sep. 25, 1997, Oct. 1, 1999, Apr. 12, 2000, and Jan. 14, 2003, 198 pages.

NAVSTAR GPS, Interface Control Document GPS (200), Jul. 1, 1992, 146 pages.

Neilan et al., "The International GPS Service: A Global Resource for GPS Applications and Research," Institute of Navigation, ION GPS-97, 10th International Technical Meeting, Kansas City, Missouri, Sep. 16-19, 1997, 6 pages.

Notice of Prior Art by the Commission Investigative Staff, dated Feb. 15, 2008, by the United States International Trade Commission Investigation No. 337-TA-602, Certain GPS Devices and Products Containing Same, 2 pages.

Notice of Prior Art by the Complainant, dated Feb. 15, 2008, Pursuant to Ground Rule 5, United States International Trade Commission Investigation No. 337-TA-602, Certain GPS Devices and Products Containing Same, 12 pages.

(56) References Cited

OTHER PUBLICATIONS

Notice of Prior Art dated Feb. 15, 2008, by the Respondents, United States International Trade Commission Investigation No. 337-TA-602, Certain GPS Devices and Products Containing Same, 145 pages.
Opinion dated Jan. 27, 2009, by the Commission, United States International Trade Commission Investigation No. 337-TA-602, Certain GPS Devices and Products Containing Same, 29 pages.
Rebuttal Expert Report of Phil Dafesh, dated Mar. 10, 2008, Regarding U.S. Patent Nos. 6,651,000 and 7,158,080 in Response to Expert Report of Stephen Heppe (Redacted, Non-Confidential Version), United States International Trade Commission Investigation No. 337-TA-602, Certain GPS Devices and Products Containing Same, 94 pages.
RTCM Recommended Standards for Differential NAVSTAR GPS Service, Version 2.0, RTCM Special Committee No. 104, RTCM Paper 134-89/SC 104-68, Jan. 1, 1990, 95 pages.
Russell, et al. "Control Segment and User Performance," Navigation: Journal of the Institute of Navigation, vol. 25, No. 2, Summer 1978, 7 pages.
Schenewerk et al., "Rapid Turnaround GPS Ephermerides from the National Geodetic Survey," Proceedings of the ION GPS-93, Institute of Navigation, 1993, 9 pages.
Second Supplemental Report of Dr. Stephen Heppe, dated Apr. 8, 2008, Regarding Invalidity of U.S. Patent Nos. 7,158,080, 6,651,000 and 6,704,651, United States International Trade Commission Investigation No. 337-TA-602, Certain GPS Devices and Products Containing Same, 34 pages.
SiRf v. Broadcom, U.S. Court of Appeals for the Federal Circuit, 2009-1262, decided Apr. 12, 2010, 23 pages.
Sirola, "A Method for GPS Positioning Without Current Navigation Data," Tampere University of Technology, Department of Electrical Engineering, Master Science Thesis, Oct. 17, 2001, 52 pages.
Sixth Supplemental Objections and Repsonses dated Apr. 13, 2008. by Respondent SiRF Technology, Inc. to Global Locate, Inc.'s First Set of Interrogatories (Nos. 19, 21-23, and 27-28), United States International Trade Commission Investigation No. 337-TA-602, Certain GPS Devices and Products Containing Same, 7 pages.
Spilker Jr. et al., "Overview of GPS Operation and Design," Global Positioning System: Theory and Applications vol. 1, Progress in Astronautics and Aeronautics, vol. 163, Ch. 2, 1996, 30 pages.
Springer et al., "1999 Analysis Coordinator Report", International GPS Service or Geodynamics (IGS), IGS Central Bureau, Jet Propulsion Laboratory, California Institute of Technology, Pasadena, CA, Nov. 2000, 154 pages.
Syrjarinne, "Time Recovery through Fusion of Inaccurate Network Timing Assistance with GPS Measurements," Proc. 3rd Int. Conference on Information Fusion, Paris, France, vol. II, pp. WeD5-3-WeD5-10, Jul. 10-13, 2000, 9 pages.
van Diggelen, "Global Locate Indoor GPS Chipset and Services," ION-GPS-2001, Salt Lake City, Utah, Sep. 11-14, 2001, 7 pages.
Yiu et al., "A Low-Cost GPS Receiver for Land Navigation," Global Positioning System, Hewlett-Packard Laboratories, Palo Alto, CA, May 1982, 17 pages.
Young, et al., "GPS Precision Orbit Determination: Measured Receiver Performance," Jet Propulsion Laboratory, California Institute of Technology, http://hdl.handle.net/2014/35887, 1993, 13 pages.
Zhao, "Standardization of Mobile Phone Positioning for 3G Systems," IEEE Communications Magazine, Jul. 2002, 9 pages.
Zhao, Y, "Mobile Phone Location Determination and Its Impact on Intelligent Transportation Systems," IEEE Transactions on Intelligent Transportation Systems, vol. 1, No. 1, Mar. 2000, 10 pages.
Zumberge et al., "1996 Annual Report," International GPS Service for Geodynamics (IGS), IGS Central Bureau, Jet Propulsion Laboratory, California Institute of Technology, Pasadena, CA, Nov. 1997, 461 pages.
Zumberge et al., "Ephemeris and Clock Navigation Message Accuracy," Global Positioning System: Theory and Applications, Ch. 16, Jet Propulsion Laboratory, California Institute of Technology, Pasadena, CA, 1994, 15 pages.

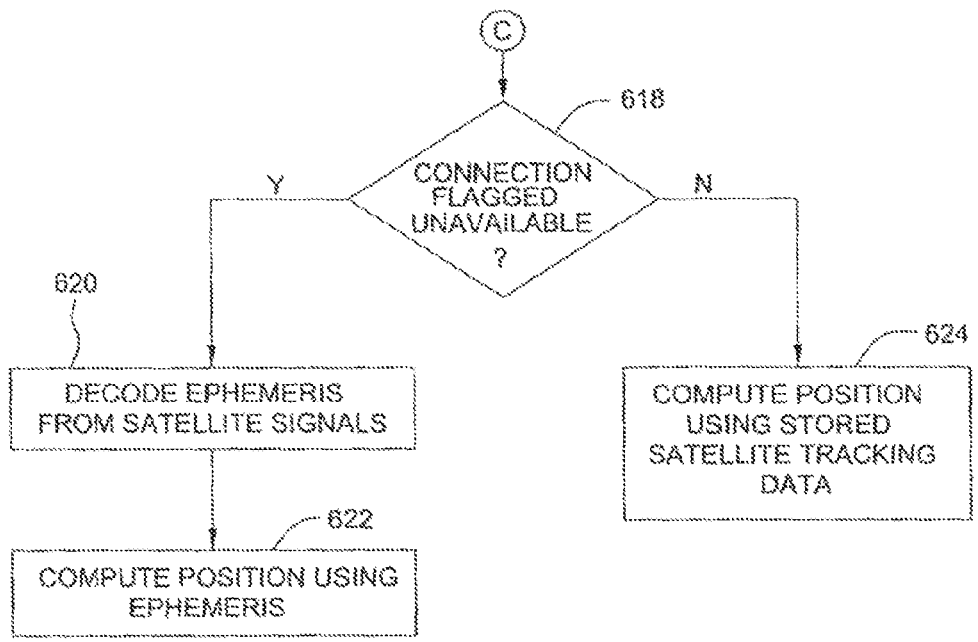
FIG. 6C
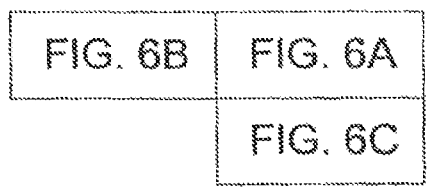

METHOD AND APPARATUS FOR ENHANCED AUTONOMOUS GPS

CROSS-REFERENCE TO RELATED APPLICATIONS

This application is a continuation of U.S. patent application Ser. No. 12/544,614 (now U.S. Pat. No. 8,134,500), filed Aug. 20, 2009, which is a continuation of U.S. patent application Ser. No. 11/057,060 (now U.S. Pat. No. 7,595,752), filed Feb. 11, 2005, which is a continuation-in-part of U.S. patent application Ser. No. 10/674,267 (now U.S. Pat. No. 7,158,080), filed Sep. 29, 2003, which claims benefit of U.S. provisional patent application Ser. No. 60/415,364, filed Oct. 2, 2002. Each of the aforementioned related patent applications is herein incorporated by reference.

BACKGROUND OF THE INVENTION

1. Field of the Invention

The present invention generally relates to a position location system and, more particularly, to using long term satellite tracking data in a remote receiver.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. The GPS satellites transmit to the receivers satellite-positioning data, so called "ephemeris" data. In addition to the ephemeris data, the satellites transmit to the receiver absolute time information associated with the satellite signal, i.e., the absolute time signal is sent as a second of the week signal. This absolute time signal allows the receiver to unambiguously determine a time tag for when each received signal was transmitted by each satellite. By knowing the exact time of transmission of each of the signals, the receiver uses the ephemeris data to calculate where each satellite was when it transmitted a signal. Finally, the receiver combines the knowledge of satellite positions with the computed distances to the satellites to compute the receiver position.

More specifically, GPS receivers receive GPS signals transmitted from orbiting GPS satellites containing unique pseudo-random noise (PN) codes. The GPS receivers determine the time delays between transmission and reception of the signals by comparing time shifts between the received PN code signal sequence and internally generated PN signal sequences.

Each transmitted GPS signal is a direct sequence spread spectrum signal. The signals available for commercial use are provided by the Standard Positioning Service. These signals utilize a direct sequence spreading signal with a 1.023 MHz spread rate on a carrier at 1575.42 MHz (the L1 frequency). Each satellite transmits a unique PN code (known as the C/A code) that identifies the particular satellite, and allows signals transmitted simultaneously from several satellites to be received simultaneously by a receiver with very lithe interference of any one signal by another. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels, the PN pattern may still be observed, to provide unambiguous time delay measurements, by processing, and essentially averaging, many PN frames. These measured time delays are called "sub-millisecond pseudoranges", since they are known modulo the 1 millisecond PN frame boundaries. By resolving the integer number of milliseconds associated with each delay to each satellite, then one has true, unambiguous, pseudoranges. The process of resolving the unambiguous pseudoranges is known as "integer millisecond ambiguity resolution".

A set of four pseudoranges together with the knowledge of the absolute times of transmissions of the GPS signals and satellite positions at those absolute times is sufficient to solve for the position of the GPS receiver. The absolute times of transmission are needed in order to determine the positions of the satellites at the times of transmission and hence to determine the position of the GPS receiver. GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

It is always slow (no faster than 18 seconds), frequently difficult, and sometimes impossible (in environments with very low signal strengths), for a GPS receiver to download ephemeris data from a satellite. For these reasons, it has long been known that it is advantageous to send satellite orbit and clock data to a GPS receiver by some other means in lieu of awaiting the transmission from the satellite. This technique of providing satellite orbit and clock data, or "aiding data", to a GPS receiver has become known as "Assisted-GPS" or A-GPS.

In one type of A-GPS system, the GPS receiver measures and transmits pseudoranges to a server and the server locates position of the GPS receiver. Such a system is referred to herein as a "mobile-assisted" system. In a mobile-assisted system, for each position computation, there are four transactions between the GPS receiver and the server: a request for assistance from the receiver to the server, transmission of aiding information from the server to the receiver, transmission of pseudorange measurements from the receiver to the server, and finally transmission of position from the server to the receiver. In most mobile-assisted systems, a new request and new aiding information are sent for each new position, since the assistance data is only valid for a short period of time (e.g., minutes). Thus, for mobile-assisted systems, the total time to fix position is deleteriously affected by the number of transactions between the receiver and the server. In addition, if the receiver roams beyond the service area of the network that delivers the assistance data, the receiver must acquire satellite signals and compute position autonomously, assuming the receiver is even capable of autonomous operation.

In another type of A-GPS system, the GPS receiver locates its own position using assistance data from a server. Such a system is referred to herein as a "mobile-based" system. In a mobile-based system, for each position computation, there are up to two transactions between the receiver and the server: the receiver requests assistance from the server and the server sends aiding information to the receiver. The position is computed inside the receiver using the aiding information. In conventional mobile-based systems, the aiding information is ephemeris data valid between 2 to 4 hours. That is, the ephemeris data is the same data as broadcast by the satellites. Thus, for conventional mobile-based systems, the total time to fix position may be deleteriously affected if the receiver must compute position outside of the 2-to-4 hour period during which the aiding data is valid, since further transactions between the receiver and the server are required. In addition, if the receiver roams beyond the service area of the network that delivers the assistance data for a period longer than 2-to-4 hours, the receiver must acquire satellite signals and compute position autonomously.

Therefore, there exists a need in the art for a method and apparatus that uses satellite tracking data in a remote receiver in a manner that minimizes the number of transactions between the receiver and a server and allows for extended operation outside of the service area of the network.

SUMMARY OF THE INVENTION

A method and apparatus for using long term satellite tracking data in a remote receiver is described. In one embodiment of the invention, long term satellite tracking data is received at a remote receiver from a server. For example, the long term satellite tracking data may include satellite orbit, satellite clock, or satellite orbit and clock information that is valid for a period of at least six hours into the future. The long term satellite tracking data may be generated at the server using satellite tracking information obtained from a reference network, satellite control station, or both. For example, the long term satellite tracking data may be generated using blocks of satellite orbit and/or clock models, such as ephemeris data.

The tong term satellite tracking data is used to compute acquisition assistance data in the remote receiver. For example, acquisition assistance data may comprise expected Doppler shifts for satellite signals transmitted by satellites in view of the remote receiver. The Doppler shifts may be computed using an estimated position, an estimated time of day, and the long term satellite tracking data. The remote receiver then uses the acquisition assistance data to acquire satellite signals. The acquired satellite signals may be used to locate position of the remote receiver.

In another embodiment, long term satellite tracking data is obtained at a remote receiver. Satellite positioning system (SPS) satellites are detected. Pseudoranges are determined from the remote receiver to the detected SPS satellites. Position of the remote receiver is computed using the pseudoranges and the long term satellite tracking data. In one embodiment, SPS satellites are detected using at least one of acquisition assistance data computed using a previously computed position and a blind search. Use of long term satellite tracking data obviates the need for the remote receiver to decode ephemeris from the satellites. In addition, position of the remote receiver is computed without obtaining an initial position estimate from a server or network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A through 6C depict a flow diagram of an exemplary embodiment of a process for locating position of a remote receiver using long term satellite tracking data;

To facilitate understanding, identical reference numerals have been used, wherever possible, to designate identical elements that are common to the figures.

DETAILED DESCRIPTION OF THE INVENTION

Figure 1:
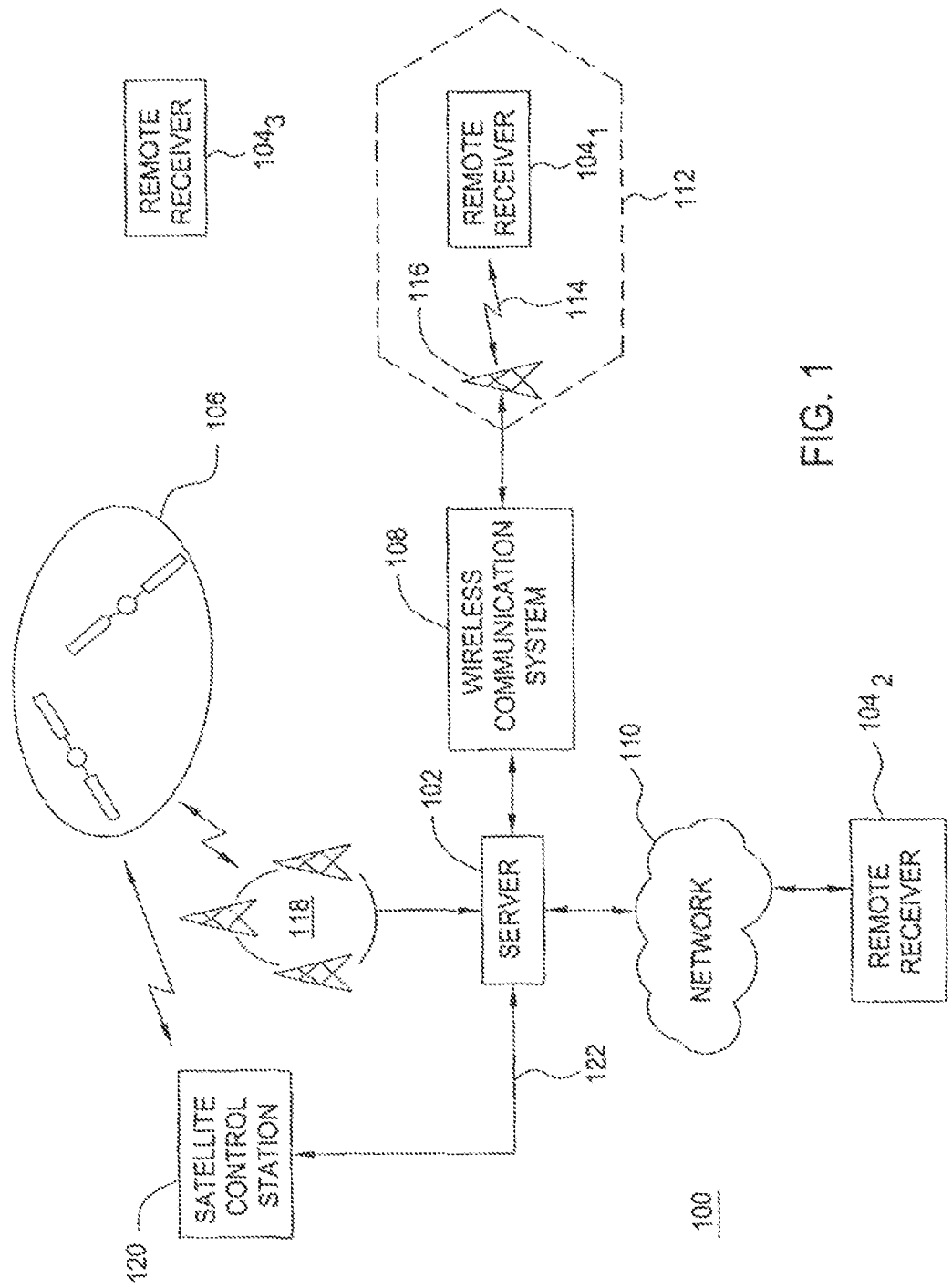
FIG. 1 is a block diagram depicting an exemplary embodiment of a position location system.

FIG. 1 is a block diagram depicting an exemplary embodiment of a position location system 100. The system 100 comprises a server 102 and a plurality of remote receivers 104, illustratively, a remote receiver $104_1$, a remote receiver $104_2$, and a remote receiver $104_3$. The remote receivers 104 measure pseudoranges to a plurality of satellites 106 in a constellation of satellites to locate position. For example, the remote receivers 104 may measure pseudoranges to a plurality of global positioning system (GPS) satellites in the GPS constellation. The server 102 distributes data representative of satellite trajectory information, satellite clock information, or both to facilitate operation of the remote receivers 104 ("satellite tracking data"). Notably, the remote receivers 104 may use the satellite tracking data to assist in acquiring satellite signals and/or compute position.

The server 102 may distribute the satellite tracking data to the remote receivers 104 using a communication link, such as a wireless communication system 108 or a network 110. For example, the remote receiver $104_1$ may be located in a service area 112 of the wireless communication system 108. In one embodiment of the invention, satellite tracking data may be transmitted to the remote device $104_1$ through a wireless link 114 between the remote device $104_1$ and a basestation 116 located within the service area 112 of the wireless communication system 108. For example, the wireless communication system 108 may be a cellular telephone network, the service area 112 may be a cell site, and the basestation 116 may be a cell tower servicing the cell site. In another embodiment, satellite tracking data may be provided by the server 102 to the network 110 and transmitted to the remote receiver $104_2$. For example, the remote receiver $104_2$ may download satellite tracking data from the Internet. In some cases, one or more of the remote receivers 104 (e.g., the remote receiver $104_3$) may not be capable of receiving satellite tracking data from the server 102. For example, the remote receiver $104_3$ may roam outside of the service area 112 and may not be capable of connecting to the wireless communication system 108. In addition, the remote receiver $104_3$ may not be able to connect to the network 110. As described in detail below, the satellite tracking data distributed to the remote receivers 104 by the server 102 is valid for a long time as compared to standard broadcast ephemeris (e.g., two to four days). As such, the remote receiver $104_3$ may continue to operate for a significant duration despite the unavailability of a connection to the server 102.

The satellite tracking data may be generated using various types of satellite measurement data ("satellite tracking information"). In particular, the server 102 receives satellite tracking information from an external source, such as a network of tracking stations ("reference network 118") or a satellite control station 120, or both. The reference network 118 may include several tracking stations that collect satellite tracking information from all the satellites in the constellation, or a few tracking stations, or a single tracking station that only collects satellite tracking information for a particular region of the world. The satellite tracking information received from the reference network 118 includes, for example, at least one of satellite ephemeris, code phase measurements, carrier phase measurements, and Doppler measurements. An exemplary system for collecting and distributing ephemeris data using a reference network is described in U.S. Pat. No. 6,411,892, issued Jun. 25, 2002, which is incorporated by reference herein in its entirety. The server 102 may receive satellite tracking information (e.g., ephemeris) from the satellite control station 120 (e.g., the Master Control Station in GPS) via a communication link 122. An exemplary system for obtaining ephemeris information directly from a satellite control station is described in U.S. patent application Ser. No. 10/081,164, filed Feb. 22, 2002, which is incorporated by reference herein in its entirety.

The server 102 generates satellite tracking data for distribution to the remote receivers 104 using the satellite tracking information received from the reference network 118 and/or the satellite control station 120. The satellite tracking data generated by the server 102 comprises satellite trajectory data, satellite clock data, or both. The satellite tracking data is valid for a long period of time as compared to the ephemeris data broadcast by the satellites 106. In one embodiment of the invention, the satellite trajectory data is valid for at least six hours. In another embodiment, the satellite trajectory data is valid for up to four days. As such, the satellite tracking data delivered to the remote receivers 104 may be referred to herein as "long term satellite tracking data" in order to distinguish such data from the broadcast ephemeris, which is typically only valid between 2 and 4 hours. An exemplary system for generating satellite tracking data is described in U.S. Pat. No. 6,542,820, issued Apr. 1, 2003, which is incorporated by reference herein in its entirely.

Figure 2:
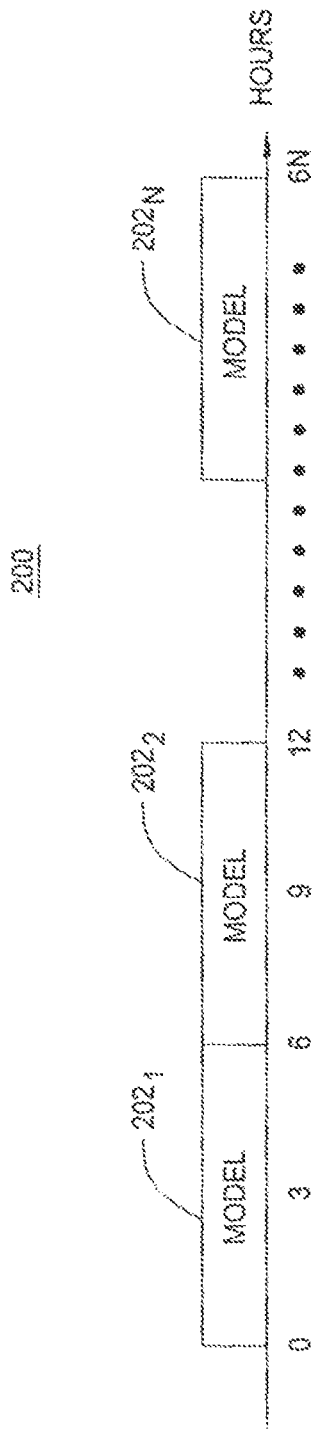
FIG. 2 is a block diagram depicting an exemplary embodiment of satellite tracking data.

FIG. 2 is a block diagram depicting an exemplary embodiment of satellite tracking data 200. The satellite tracking data 200 includes a plurality of models $202_1$ through $202_N$ (collectively referred to as models 202), where N is an integer greater than or equal to one. Each of the models 202 is valid for a particular period of time into the future (e.g., six hours in the present embodiment). Each of the models 202 includes satellite trajectory data, satellite clock data, or both. The satellite trajectory data portion of each of the models 202 may include one or more of data representative of satellite positions, satellite velocities, and satellite accelerations. The satellite clock data portion of each of the models 202 may include one or more of data representative of satellite clock offsets, satellite clock drifts, and satellite clock drift rates. In one embodiment of the invention, each of the models 202 includes ephemeris data collected from the reference network 118 and/or the satellite control station 120. In another embodiment, each of the models 202 may be in some other format for representing orbital parameters and/or clock parameters. Exemplary models for the satellite tracking data are described in U.S. Pat. No. 6,542,820.

The satellite tracking data 200 is defined by N sequential blocks of satellite orbit and/or clock data (i.e., the N models 202). For purposes of clarity by example, each of the models 202 is valid for a period of six hours and thus the satellite tracking data is valid for a 6N hours. It is to be understood, however, that each of the models 202 may be valid for other durations. For example, satellite tracking data valid for four days may be generated using 16 sequential ones of the models 202.

Returning to FIG. 1, in one embodiment of the invention, the satellite tracking data generated by the server 102 is associated with all the satellites in the constellation. Thus, no matter where the remote receivers 104 compute position, the remote receivers 104 will have the correct information for the satellites that are in view. In another embodiment, the satellite tracking data generated by the server 102 is associated with only the satellites that will be visible in a particular region (e.g., country of operation of the remote receivers 104) during the period of validity of the orbit and clock data therein. For example, as described above, the satellite tracking data may be formed from 16 sequential 6-hour orbit and/or clock models covering a total of four days into the future. For some of these 6-hour periods, some satellites will not be visible anywhere in the country of operation of the remote receivers 104 and the server 102 can be configured to remove these particular models from the satellite tracking data before the satellite tracking data is distributed to the remote devices 104. Since the server 102 provides satellite tracking data for all possible satellites (e.g., all the satellite in the constellation or all satellites visible in a particular region), the data is not dependent on the position of the remote receivers 104 at the time of delivering the satellite tracking data, so long as the remote receivers are somewhere in the particular region.

Figure 3:
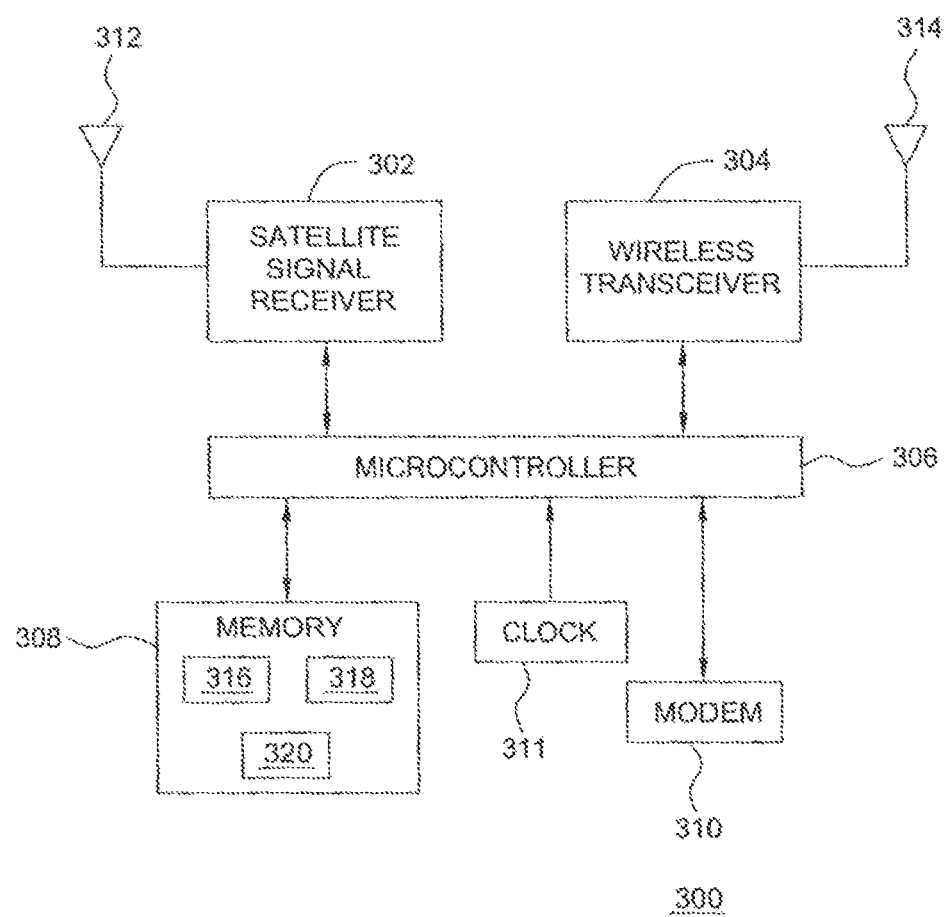
FIG. 3 is a block diagram depicting an exemplary embodiment of a remote receiver.

FIG. 3 is a block diagram depicting an exemplary embodiment of a remote receiver 300. The remote receiver 300 may be used as any of the remote receivers 104 shown in FIG. 1. The remote receiver 300 illustratively comprises a satellite signal receiver 302, a wireless transceiver 304, a microcontroller 306, a memory 308, a modem 310, and a clock 311. The satellite signal receiver 302 receives satellite signals via an antenna 312. The satellite signal receiver 302 processes the satellite signals to form pseudoranges in a well-known manner. An exemplary assisted-GPS signal receiver is described in U.S. Pat. No. 6,453,237, issued Sep. 17, 2002, which is incorporated by reference herein in its entirety. The clock 311 may be used to establish an estimated time of day.

The memory 300 may be random access memory, read only memory, removable storage, hard disc storage, or any combination of such memory devices. The memory 308 may store satellite tracking data 316 that can be used to assist in the acquisition of satellite signals or the computation of position or both. The satellite tracking data 316 may be received via an antenna 314 using the wireless transceiver 304, or via a computer network (e.g., Internet) using the modem 310. The memory 300 may also store a table of positions ("table 318"). The table 318 may include any recently computed positions of the remote receiver 400 and/or any positions of basestations or cell sites with which the remote receiver 300 has recently communicated. The table 318 may be used to establish an estimated position of the remote receiver 300. As described below, an estimated position of the remote receiver 300 and an estimated time of day may be used to generate data to assist in the acquisition of the satellite signals from the satellite tracking data 316 ("acquisition assistance data" 320).

Figure 4:
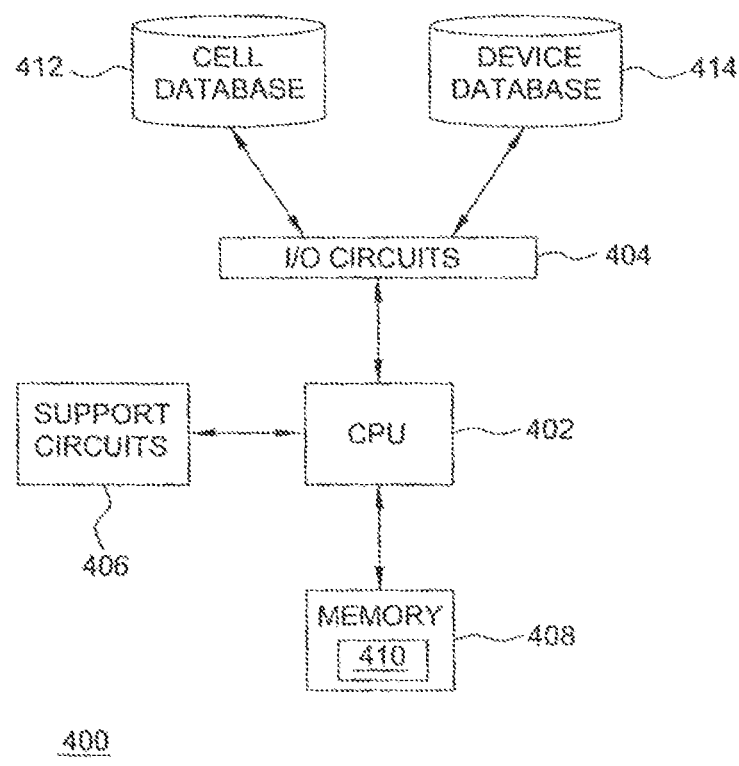
FIG. 4 is a block diagram depicting an exemplary embodiment of a server.

FIG. 4 is a block diagram depicting an exemplary embodiment of the server 400. The server 400 may be used as the server 102 shown in FIG. 1. The server 400 illustratively comprises a central processing unit (CPU) 402, input/output (I/O) circuits 404, support circuits 406, and a memory 408. The support circuits 406 comprise well-known circuits that facilitate operation of the CPU 402, such as clock circuits, cache, power supplies, and the like. The memory 408 may be random access memory, read only memory, removable storage, hard disc storage, or any combination of such memory devices.

Satellite tracking information 410 (e.g., ephemeris, code phase measurements, carrier phase measurements, Doppler measurements) is received from an external source of such information (e.g., reference network and/or satellite control station) using the I/O circuits 404 and stored in the memory 408. The server 400 uses the satellite tracking information 410 to compute long term satellite tracking data for use by remote devices. The I/O circuits 404 may also be coupled to a cell database 412. The cell database 412 stores a database of identification indicia ("cell ID") for various basestations or cell sites of a wireless communication system along with the positions of the basestations or cell sites. As described below, basestation or cell site position may be used as an approximate position of the remote receiver. Alternatively, an approximate position of the remote receiver may be determined using a transition between cell sites or basestations, a last known location, or the like.

The I/O circuits 404 may also be coupled to a device database 414. The device database 414 may be used to keep track of when particular satellite tracking data was distributed to which remote receiver and when such satellite tracking data will expire. Using the device database 414, the server 400 can determine when to update the remote receivers with new satellite tracking data. An exemplary process for transmitting satellite tracking data to a remote receiver is described below.

Figure 5:
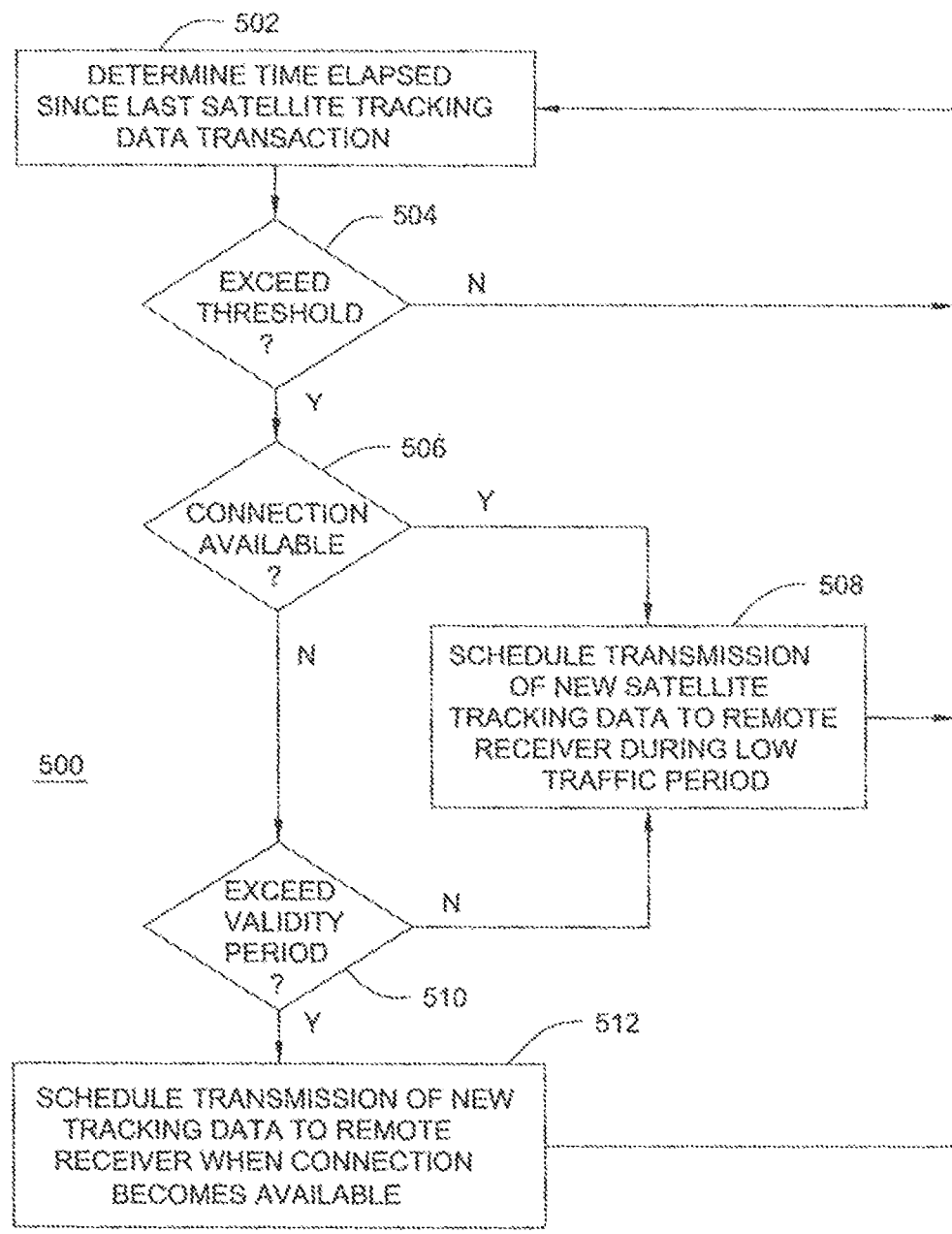
FIG. 5 is a flow diagram depicting an exemplary embodiment of a process for automatically transmitting satellite tracking data to a remote receiver.

Satellite tracking data may be delivered to the remote receivers in response to requests from the remote receivers. For example, a user of a remote receiver may manually request satellite tracking data from the server, or may initiate a position computation that requires satellite tracking data. Satellite tracking data may also be delivered automatically to the remote receivers. FIG. 5 is a flow diagram depicting an exemplary embodiment of a process 500 for automatically transmitting satellite tracking data to a remote receiver. The process 500 may be executed by either the server or the remote receiver. That is, the remote receiver may determine when it needs satellite tracking data or the server may determine when the remote receiver needs satellite tracking data.

The process 500 begins at step 502, where the time elapsed since the last satellite tracking data transaction is determined. At step 504, a determination is made as to whether the elapsed time exceeds a predetermined threshold. The threshold may be a percentage of the validity period of the satellite tracking data. For example, if the satellite tracking data is valid for four days, the threshold may be set as two days. Thus, if two days have elapsed since the last satellite tracking data transaction, the threshold has been exceeded. If the threshold has been exceeded, the process 500 proceeds to step 506. Otherwise, the process 500 returns to step 502.

At step 506, a determination is made as to whether a connection to the server is available. For example, a connection to the server may not be available if the remote receiver is powered off or has roamed outside of the service area of the system. If a connection is available, the process 500 proceeds to step 508.

At step 508, new satellite tracking data is scheduled to be transmitted to the remote receiver during a low traffic period. Since the threshold of step 504 is set to a percentage of the validity period of the satellite tracking data, the remote receiver does not immediately require new satellite tracking data, as the currently stored satellite tracking data remains valid. Thus, new satellite tracking data may be sent to the remote receiver using either a wireless communication system or other network during a period of low activity on such network.

If, at step 506, a connection is unavailable, the process 500 proceeds to step 510. At step 510, a determination is made as to whether the elapsed time has exceeded the validity period of the satellite tracking data. If not, the process 500 proceeds to step 508 described above. That is, the server will schedule a transmission of new satellite tracking data to the remote receiver during a low traffic period. Since the threshold of step 504 is set to a percentage of the validity period of the satellite tracking data, the remote receiver does not immediately require new satellite tracking data. The remote receiver may continue to operate using valid satellite tracking data until a connection becomes available, at which time new satellite tracking data may be sent during a low traffic period.

If, at step 510, the elapsed time has exceeded the validity period of the satellite tracking data, the process 500 proceeds to step 512. At step 512, new satellite tracking data is scheduled to be transmitted to the remote receiver when a connection becomes available. That is, when the remote device again connects to the system, the new satellite tracking data may be uploaded to the remote device.

As such, all remote receivers will have valid satellite tracking data for almost all of the time that they are capable of connecting to the server. In addition, almost all of the remote receivers will immediately benefit from assisted-GPS operation when they require a location fix, without having to make a request (or satellite tracking data or wait for satellite tracking data to be delivered. Thus, the number of server transactions is minimized. Remote receivers that are not capable of connecting to the server may continue to operate using the satellite tracking data for an extended period of time (e.g., four days) while disconnected from the server. In addition, the satellite tracking data is independent of the precise time at which the remote receivers will use it.

Figure 6A:
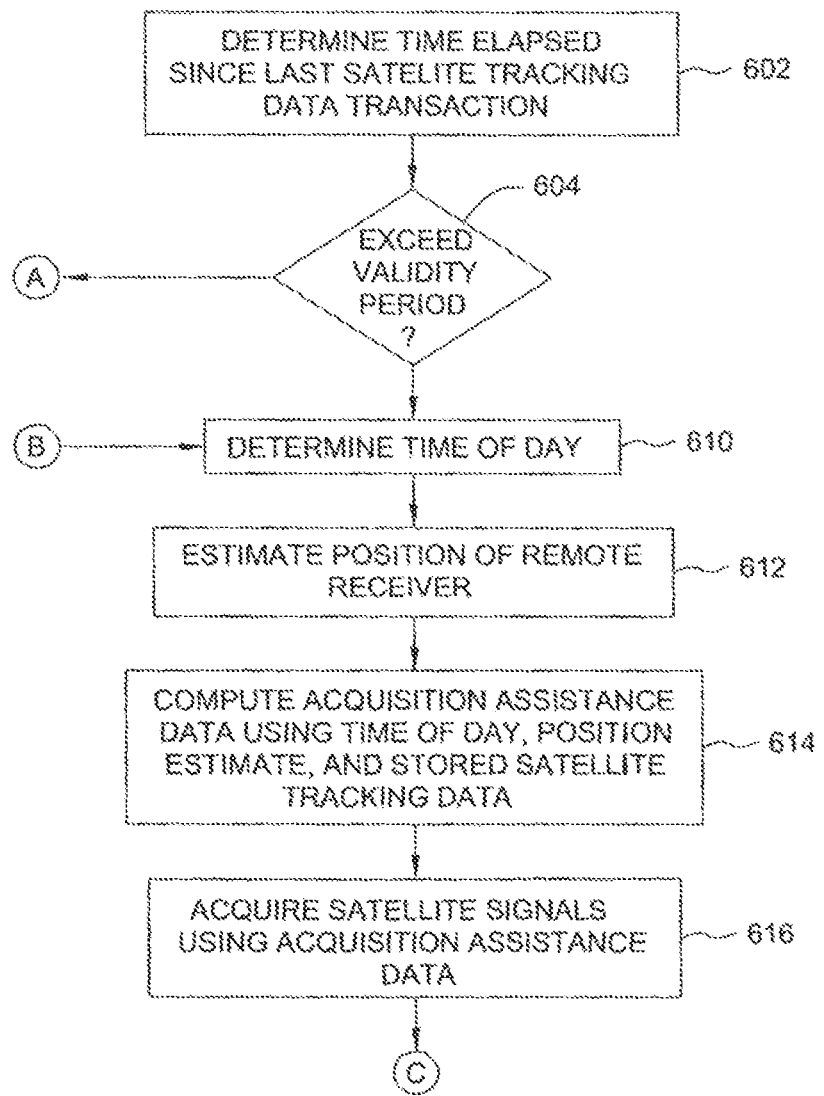
Figure 6B:
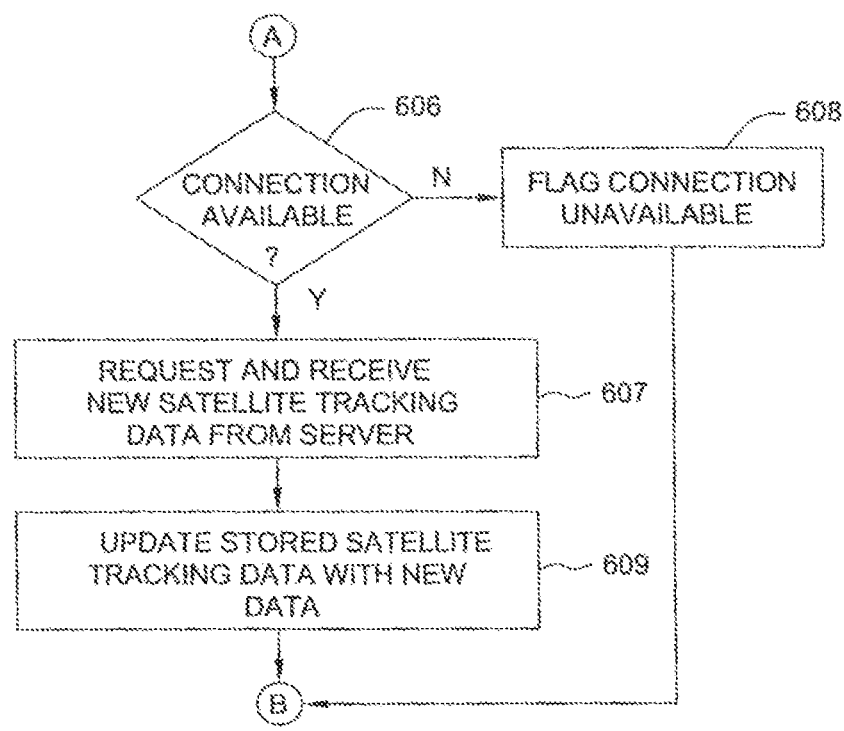

FIGS. 6A through 6C depict a flow diagram of an exemplary embodiment of a process 600 for locating position of a remote receiver using long term satellite tracking data. The process 600 begins at step 602, where the time elapsed since the last satellite tracking data transaction is determined. At step 604, a determination is made as to whether the validity period of the satellite tracking data has been exceeded. For example, the satellite tracking data may be valid for four days. If the satellite tracking data is invalid, the process proceeds to step 606. Otherwise, the process 600 proceeds to step 610.

At step 606, a determination is made as to whether a connection between the server and the remote receiver is available. If not, the process 600 proceeds to step 608, where the connection is flagged as unavailable. Otherwise, the process 600 proceeds to step 607. At step 607, new satellite tracking data is requested and received from the server at the remote receiver. At step 609, the stored satellite tracking data is updated with the new satellite tracking data. The process then proceeds to step 610.

At step 610, time of day is determined. In one embodiment, an estimated time of day may be determined using a clock within the remote receiver. At step 612, a position of the remote receiver is estimated. At step 614, acquisition assistance data is computed using the time of day, estimated position, and the stored satellite tracking data (or Almanac data). The acquisition assistance data aids the remote receiver in acquiring satellite signals. In one embodiment, the acquisition assistance data comprises predicted Doppler shifts for each satellite in view of the remote receiver. In GPS, all of the satellite signals leave the satellites at the same frequency of exactly 1575.42 MHz. The frequency of the satellite signals observed at the remote receiver, however, will be shifted ±4.5 KHz due to relative satellite motion. A satellite rising over the horizon exhibits a Doppler shift up to 4.5 KHz higher, a setting satellite exhibits a Doppler shift up to 4.5. KHz lower, and a satellite at its zenith (the highest point in the sky from the point of view of the remote receiver) will exhibit no Doppler shift.

The remote receiver may use the position estimate, the time of day, and the stored satellite tracking data (or Almanac data) to compute Doppler shifts relative to the estimate position of the remote receiver. As described above, in one embodiment, the satellite tracking data is provided in the form of blocks of ephemeris data. If such satellite tracking data is used, the computation of Doppler shifts at the estimate position and time of day is performed in a conventional manner. The acquisition assistance data provides a window or range of uncertainty around the expected Doppler shifts. The size of the uncertainty range depends on the accuracy of the initial estimate of position and the time of day. The time of day has little impact on the size of the uncertainty range and may be in error by a few seconds of GPS time. The estimate of position has a greater effect on the uncertainty range. If the position estimate is within approximately 10 km of the true position of the remote receiver, then the Doppler range may be ±10 Hz. If the position estimate is within a wide area of the true position (e.g., within a particular country of operation or within 3000 km), then the Doppler range may be ±3000 Hz. An exemplary process for estimated the position of the remote receiver is described below. As is well known in the art, the search range for Doppler must also include the uncertainty of the local reference frequency in the remote receiver.

At step 616, satellite signals are acquired at the remote receiver using the acquisition assistance data. In one embodiment, the remote receiver searches for the satellite signals within the frequency range defined by the acquisition assistance data and local frequency reference. The time it takes to acquire the necessary satellite signals in order to compute an initial position ("time to first fix") depends on the size of the frequency window. A smaller frequency window yields a faster time to first fix.

At step 618, a determination is made as to whether the connection has been flagged as unavailable. If not, the process 600 proceeds to step 624, where position of the remote receiver is computed using the stored satellite tracking data. If the connection is flagged as unavailable at step 608, the process proceeds to step 620. At step 620, ephemeris is decoded from the acquired satellite signals. While invalid or "old" satellite tracking data, or satellite almanac data, may be used to compute the acquisition assistance data at step 614, such expired or imprecise satellite tracking data may not be used in order to compute position of the remote receiver. As such, if the stored satellite tracking data is expired and the remote receiver cannot connect to the server to obtain new satellite tracking data, then the remote receiver must decode the satellite signals to obtain ephemeris information. At step 622, position of the remote receiver may be computed using the ephemeris information.

Figure 7:
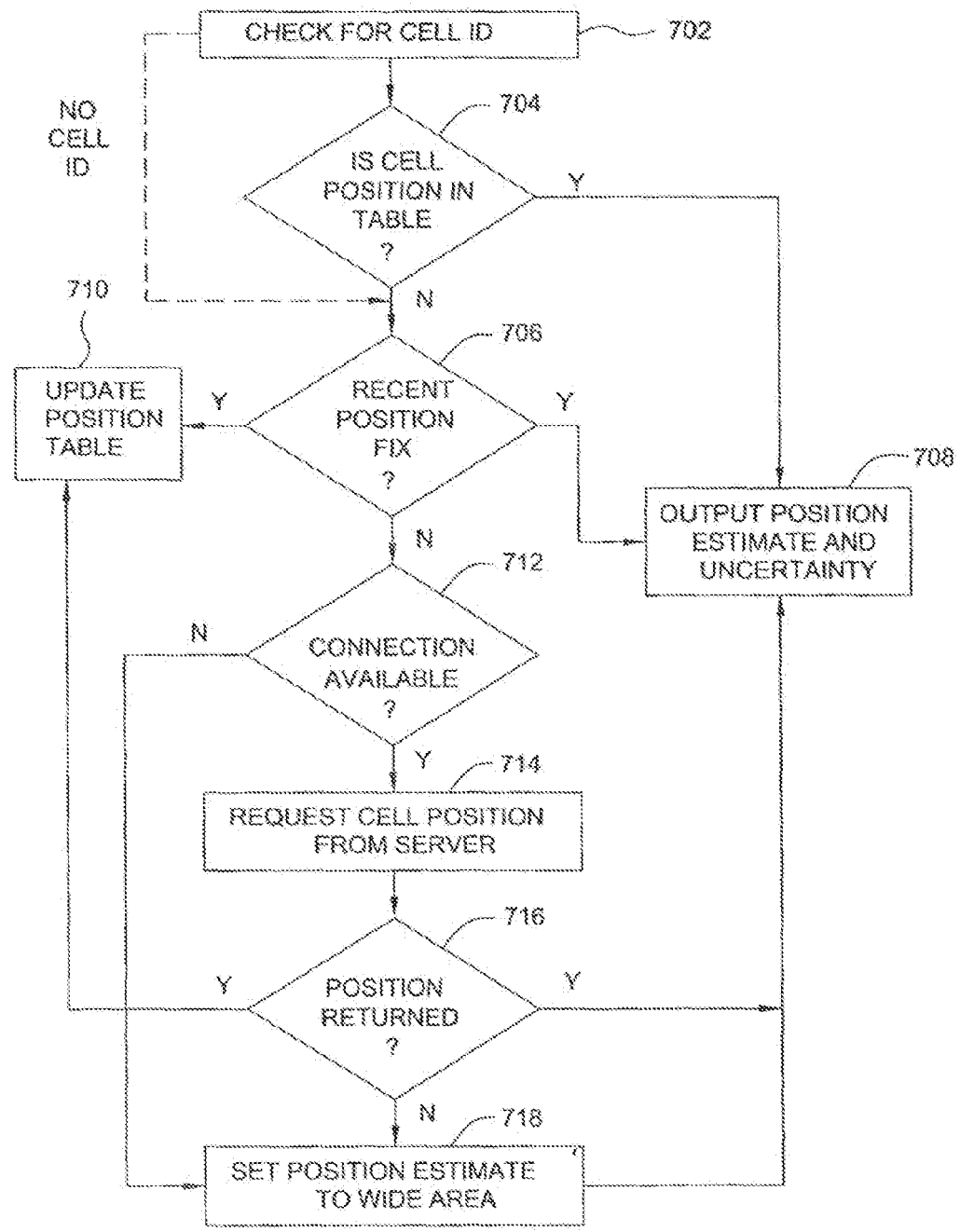
FIG. 7 is a flow diagram depicting an exemplary embodiment of a process for estimating a position of a remote receiver.

FIG. 7 is a flow diagram depicting an exemplary embodiment of a process 700 for estimating a position of a remote receiver. The process 700 may be used in the step 612 of the process 600 as the primary estimation technique. Those skilled in the art will appreciate that other position estimation techniques may be used that are known in the art, such as using transitions between cell cites or basestations of the remote receiver or using a last known location of the remote receiver. The process 700 begins at step 702, where the cell ID for the cell site in which the remote receiver is currently operating ("active cell site") is determined. If there is no cell ID, or there is no active cell site, the process 700 proceeds to step 706. Otherwise, the process 700 proceeds to step 704.

At step 704, a determination is made as to whether the cell position is in a table stored within the remote receiver. That is, the remote receiver may use the cell ID to index a table of positions to identify the position of the active cell site. If a position associated with the active cell site is in the table, the process 700 proceeds to step 708, where an estimated position of the remote receiver and an uncertainty in the estimated position is output. If the cell position is not in the table, the process 700 proceeds to step 706.

At step 706, there is either no cell ID (e.g., the remote receiver is not operating within the service area of the wireless communication system) or there is no position associated with the cell ID stored in the table. Thus, a determination is made as to whether there has been a recent position fix. For example, a recent position fix may be a compute position less than three minutes old. Note that, in three minutes, if the remote receiver is traveling less than 200 km/h, then the remote receiver could have moved no more than 10 km. This is within the range of approximate position uncertainty that the remote receiver would obtain if using a position of a cell site. If there is a recent position fix, the process 700 proceeds to step 708, where the recent position fix is used as the estimated position and the estimated position and uncertainty is output. In addition, the position table may be updated with the recent position at step 710.

If there is no recent position fix at step 706, the process 700 proceeds to step 712. At step 712, a determination is made as to whether a connection between the server and the remote receiver is available. If not, the process 700 proceeds to step 718, where the position estimate is set to a wide area (e.g., country or region of operation). The process 700 proceeds from step 718 to step 708, where the position estimate and uncertainty are output.

If at step 712 a connection between the server and the remote receiver is present, the process 700 proceeds to step 714. At step 714, a position of the active cell site is requested from the server. The remote receiver may send the cell ID to the server if the cell ID has been obtained. At step 716, if a position is returned from the server, the process proceeds to step 708, where the position estimate and uncertainty are output. In addition, the position table may be updated at step 710 with the newly returned position of the particular active cell site. If at step 716 the position is not returned from the server, the process 700 proceeds to step 718, where the position estimate is set to a wide area.

By using a table of positions and utilizing recent position fixes, the remote receivers avoid unnecessary transactions with the server. Thus, rather than requesting a position for an active cell site using the cell ID, the remote receivers first determine if the information is stored locally.

A method and apparatus for using long term satellite tracking data has been described. In one embodiment of the invention, the long term satellite tracking data contains satellite orbit and/or clock data that is valid for a period between two and four days. Thus, remote receivers may continue to operate for up to four days without connecting to a server to receive updated information. If a remote receiver is not capable of connecting to the server (e.g., the remote receiver roams outside the service area of the network), the remote receiver may continue to use the long term satellite tracking data until the remote receiver is once again capable of connecting to the network. As such, the only transactions between the server and a remote device occurs once every two to four days, or when the remote device requires a position of a cell site or basestation from the server.

Having obtained the long term satellite tracking data, the remote receiver may acquire satellite signals, determine pseudoranges to acquired satellites, and compute position using the pseudoranges and the long term satellite tracking data. The remote receiver may also use the long term satellite tracking data along with a position estimate and a time estimate to produce acquisition assistance data (e.g., expected Doppler shifts) to assist in the satellite signal acquisition process. Such a process is described above with respect to FIG. 6. In one embodiment, the position estimate is obtained from the network (e.g., using cell ID).

In some cases, however, the remote receiver may not be able to obtain an initial position from the network in order to compute acquisition assistance data. For example, the remote receiver may be operating autonomously and outside the service area of the network. Thus, in another embodiment of the invention, the remote receiver attempts to use a previously computed position as an initial position for computing acquisition assistance data and determining pseudoranges, rather than receiving a position estimate from the network. The remote receiver then computes position using the pseudoranges and the long term satellite tracking data. The position is then checked for validity and, if invalid, the remote receiver performs a blind search process to compute position.

Figure 8:
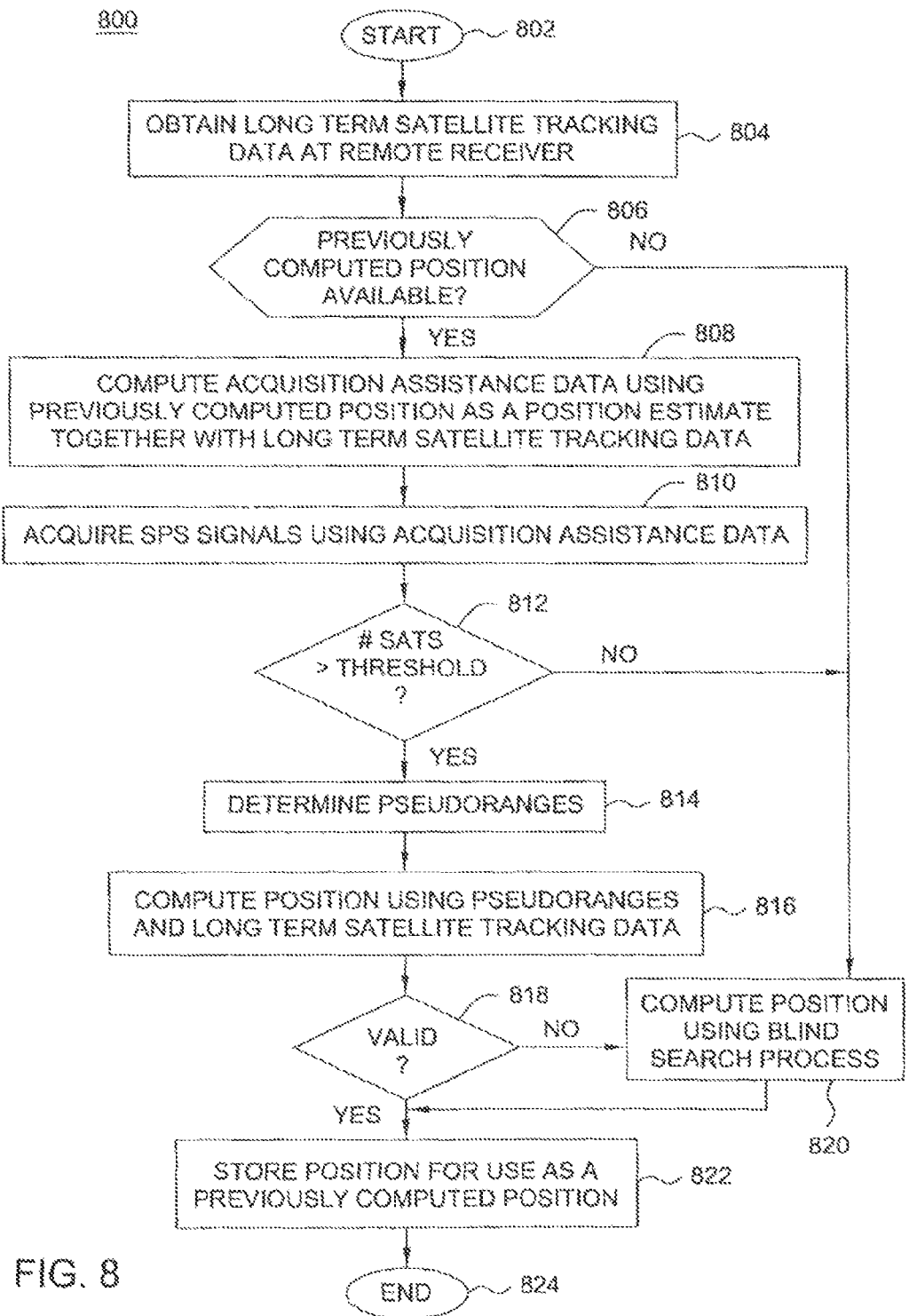
FIG. 8 is a flow diagram depicting another exemplary embodiment of a method for locating position of a remote receiver in accordance with the invention.

In particular, FIG. 8 is a flow diagram depicting another exemplary embodiment of a method 800 for locating position of a remote receiver in accordance with the invention. The method 800 is performed without obtaining an initial position estimate at the remote receiver form the network. The method 800 begins at step 802. At step 804, long term satellite tracking data is obtained. For example, the long term satellite tracking data may be obtained from memory within the remote receiver. The remote receiver may have received the long term satellite tracking data from the network, as described above with respect to FIG. 5. The remote receiver may periodically refresh the long term satellite tracking data, as described above with respect to FIG. 6.

At step 806, a determination is made as to whether a previously computed position is available. For example, the remote receiver may maintain a position cache in which computed positions are stored and from which a previously computed position may be obtained. If a previously computed position is unavailable, the method 800 proceeds to step 820. At step 820, position is computed using a blind search process. Exemplary embodiments of a blind search process that may be used in step 820 are described below with respect to FIGS. 9-11. The method 800 proceeds to step 822, where the position is stored for use as a previously computed position in a next iteration.

If, at step 806, a previously computed position is available, the method 800 proceeds to step 808. At step 808, the previously computed position is used as a position estimate and, together with the long term satellite tracking data, to compute acquisition assistance data (e.g., expected Doppler shifts). At step 810, satellite signals from satellite positioning system (SPS) satellites are acquired at the remote receiver using the acquisition assistance data.

At step 812, a determination is made as to whether the number of acquired satellites exceeds a predefined threshold. For example, the threshold may be two satellites. Thus, more than two satellites are acquired at step 810, the method 800 proceeds to step 814. Otherwise, if only two or fewer satellites are acquired at step 810, the method 800 proceeds to step 820, where the blind search process is preformed to compute position.

At step 814, pseudoranges are determined to the detected SPS satellites. The remote receiver may measure sub-millisecond pseudoranges to the detected SPS satellites using a conventional correlation process. The integer millisecond portions of the sub-millisecond pseudoranges are fixed using the previously computed position that is being used as the position estimate. In one embodiment, the integers may be fixed by relating the sub-millisecond pseudoranges and expected pseudoranges between the previously computed position and estimated satellite positions derived from the long term satellite tracking data. An exemplary process for computing pseudorange integers is described in commonly-assigned U.S. Pat. No. 6,734,821, issued May 11, 2004, which is incorporated by reference herein in its entirety.

At step 816, position of the remote receiver is computed using the pseudoranges determined at step 814 and the long term satellite tracking data obtained at step 804. The position may be computed using conventional navigation equations. At step 818, a determination is made as to whether the position computed at step 816 is valid. Notably, the integrity of the computed position may be determined using various integrity checking techniques known in the art. For example, the difference between the computed position and the previously computed position that was used as the position estimate may be computed and compared to a threshold. If the difference exceeds the threshold (e.g., 150 Km), then the computed position is flagged as invalid. Alternatively, a determination may be made as to whether the altitude of the computed position is within a reasonable range (e.g., −1 km to 15 km). If the altitude is outside the range, the computed position is flagged as being invalid. In another example, a-posteriori residuals may be formed that are associated with the measured pseudoranges. The a-posteriori residuals may be analyzed to identify any erroneous pseudoranges. If any of the pseudoranges are found to be erroneous, the computed position is deemed to be invalid. An exemplary process for analyzing a-posteriori residuals is described in U.S. Pat. No. 6,734,821, referenced above.

If, at step 818, the computed position is deemed to be invalid, the method 800 proceeds to step 820, where the blind search process is performed to compute position. Otherwise, the method 800 proceeds to step 822, where the computed position is stored for use as a previously computed position in the next iteration. The method 800 ends at step 824.

Figure 9:
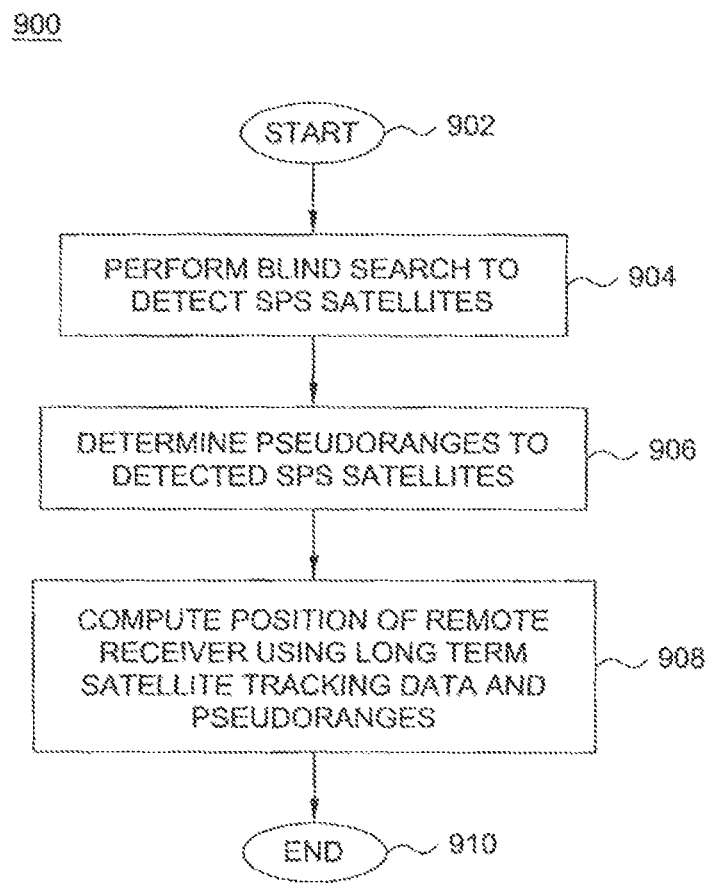
FIG. 9 is a flow diagram depicting an exemplary embodiment of a method for locating position of a remote receiver using a blind search technique in accordance with the invention.

FIG. 9 is a flow diagram depicting an exemplary embodiment of a method 900 for locating position of a remote receiver using a blind search technique in accordance with the invention. The method 900 is performed without obtaining an initial position estimate at the remote receiver from the network. The method 900 begins at step 902. At step 904, a blind search is performed to detect SPS satellites. That is, the remote receiver searches for satellite signals in a conventional manner without the benefit of acquisition assistance data. At step 906, pseudoranges are determined to the detected SPS satellites. The remote receiver may measure sub-millisecond pseudoranges to the detected SPS satellites using a conventional correlation process. The integer portions of the sub-millisecond pseudoranges are computed in a well-known manner by decoding a handover word (HOW) in a satellite navigation stream broadcast by a satellite to obtain a time-of-week (TOW) count value. At step 908, position of the remote receiver is computed using the pseudoranges determined at step 906 and the long term satellite tracking data stored in the remote receiver. The position may be computed using conventional navigation equations. The method 900 ends at step 910.

Use of the long term satellite tracking data to compute position obviates the need to decode ephemeris at the remote receiver from the satellite navigation stream for each satellite to which a pseudorange is determined. Since ephemeris does not have to be decoded, the cold start speed of the remote receiver is increased, particularly if satellite signals are weak and/or intermittent. Moreover, the method 900 is performed without the need of an initial position or precise time from the network, which allows the method 900 to be performed when the remote receiver outside the service area of the network. The position computed using the method 900 may be stored and used as a position estimate to compute acquisition assistance data in the next position location computation, as described above with respect to FIG. 8.

Figure 10:
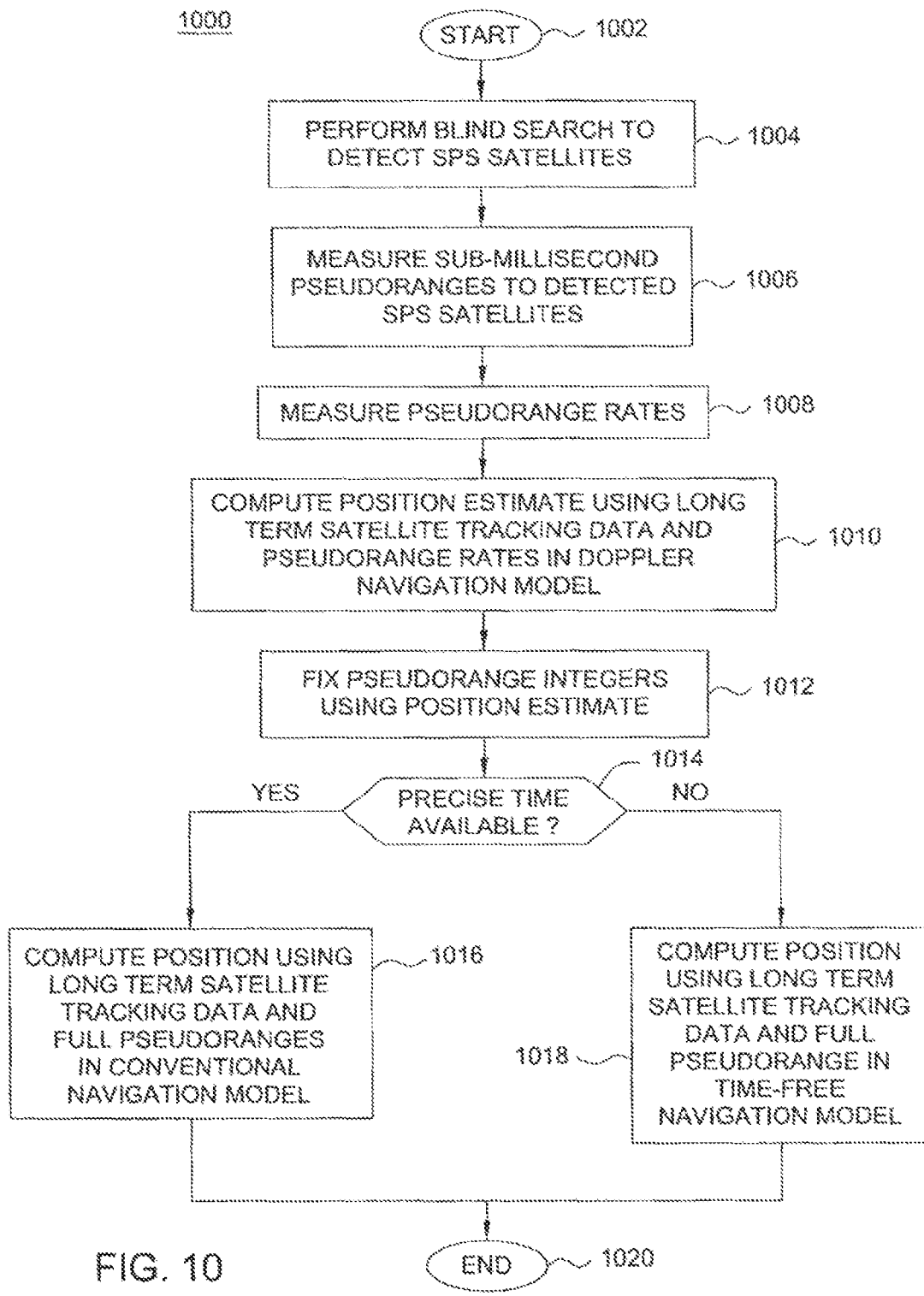
FIG. 10 is a flow diagram depicting another exemplary embodiment of a method for locating position of a remote receiver using a blind search technique in accordance with the invention.

FIG. 10 is a flow diagram depicting another exemplary embodiment of a method 1000 for locating position of a remote receiver using a blind search technique in accordance with the invention. Similar to the method 900 of FIG. 9, the method 1000 may be performed without obtaining an initial position estimate at the remote receiver from the network. The method 1000 begins at step 1002. At step 1004, a blind search is performed to detect SPS satellites. At step 1006, sub-millisecond pseudoranges are measured to the detected SPS satellites. At step 1008, pseudorange rates are measured at the remote receiver. In one embodiment, the pseudorange rates may be measured by obtaining Doppler measurements. Alternatively, the pseudorange rates may be measured by computing the time-derivative of the sub-millisecond pseudoranges.

At step 1010, an estimated position of the remote receiver is computed using long term satellite tracking data stored in the remote receiver and the pseudorange rates. In one embodiment, this may be done iteratively applying the following mathematical model:

$$\underline{u} = \begin{bmatrix} u_1 \\ \vdots \\ u_n \end{bmatrix} = \begin{bmatrix} \frac{\partial \dot{p}_1}{\partial x} & \frac{\partial \dot{p}_1}{\partial y} & \frac{\partial \dot{p}_1}{\partial z} & c \\ \vdots & \vdots & \vdots & \vdots \\ \frac{\partial \dot{p}_n}{\partial x} & \frac{\partial \dot{p}_n}{\partial y} & \frac{\partial \dot{p}_n}{\partial y} & c \end{bmatrix} \begin{bmatrix} x \\ y \\ z \\ f_c \end{bmatrix}$$

where u is the vector of pseudorange rate residuals (i.e., the difference between the measured and expected pseudorange rates), $\partial$ denotes a partial derivative, $\dot{p}_n$ is the nth pseudorange rate, and c denotes the speed of light. The variables x, y, and z are the updates to an a-priori position. In the present embodiment, there is no provided initial position, thus the above model may be applied with an initial position at the center of the earth and iterated until the updates converge. The variable $f_c$ is the update to the a-priori reference frequency offset in the remote receiver. In one embodiment, the units of $f_c$ are seconds/second, the units of c are m/s, and the units of u are m/s. The expected pseudorange rates and the matrix entries may be computed using the long term satellite tracking data. The derivation of this model is described in more detail in commonly-assigned U.S. patent application Ser. No. 10/617,559, filed Jul. 11, 2003, which is incorporated by reference herein in its entirety. Further terms, such as time-of-day offset, may be included in the above-described computation, but since only an approximate position is required (e.g. to within 10 km), it is sufficient to use approximate time-of-day in the above calculation when computing the values of u and the entries in the matrix.

In another embodiment, an estimated position of the remote receiver may be computed at step 1010 using both the pseudorange rates and the sub-millisecond pseudoranges. Notably, if only two satellites are detected at step 1004, the remote receiver will not be able to compute position using only the range rates or only the pseudoranges without additional assistance data. However, since each of the range rates and the pseudoranges provides an independent measurement, the range rates and the pseudoranges may be combined to provide sufficient measurements for computing position (e.g., four measurements for computing latitude, longitude, altitude, and common mode clock bias). Such a calculation is shown in U.S. patent application Ser. No. 10/617,559, referenced above.

At step 1012, the integer portions of the sub-millisecond pseudoranges measured at step 1006 are fixed using the estimated position computed at step 1010. In one embodiment, the integers may be fixed by relating the sub-millisecond pseudoranges measured at step 1006 and expected pseudoranges between the position estimate and estimated satellite positions derived from the long term satellite tracking data. An exemplary process for computing pseudorange integers is described in U.S. Pat. No. 6,734,821, referenced above.

At step 1014, a determination is made as to whether precise time-of-day is available at the remote receiver. For example, the remote receiver may obtain precise satellite time by decoding the HOW to obtain the TOW count message. Alternatively, the remote receiver may initially obtain precise satellite time from the network and continue to track precise time thereafter. If precise time-of-day is known at the remote receiver, the method 1000 proceeds to step 1016. At step 1016, position of the remote receiver is computed using the long term satellite tracking data and the full pseudoranges in a conventional navigation solution. If precise time-of-day is not known at the remote receiver, the method 1000 proceeds to step 1018.

At step 1018, position of the remote receiver is computed using the long term satellite tracking data and the full pseudoranges in a time-free navigation model. Notably, a mathematical model is used to relate a residual difference between the actual pseudoranges and expected pseudoranges to updates of position (e.g., x, y, and z position) and time (e.g., local clock bias ($t_c$) and time-of-day error ($t_s$)). The expected pseudoranges are based on the position estimate computed at step 1010. In one embodiment, the mathematical model may be defined as follows:

$$\underline{u} = \begin{bmatrix} u_1 \\ \vdots \\ u_n \end{bmatrix}$$

-continued $$= \begin{bmatrix} \frac{\partial \rho_1}{\partial x} & \frac{\partial \rho_1}{\partial y} & \frac{\partial \rho_1}{\partial z} & \frac{\partial \rho_1}{\partial t_c} & \frac{\partial \rho_1}{\partial t_s} \\ \vdots & \vdots & \vdots & \vdots & \vdots \\ \frac{\partial \rho_n}{\partial x} & \frac{\partial \rho_n}{\partial y} & \frac{\partial \rho_n}{\partial z} & \frac{\partial \rho_n}{\partial t_c} & \frac{\partial \rho_n}{\partial t_s} \end{bmatrix} \begin{bmatrix} x \\ y \\ z \\ t_c \\ t_s \end{bmatrix}$$

$$= \begin{bmatrix} \frac{\partial \rho_1}{\partial x} & \frac{\partial \rho_1}{\partial y} & \frac{\partial \rho_1}{\partial z} & c & -\dot{\rho}_1 \\ \vdots & \vdots & \vdots & \vdots & \vdots \\ \frac{\partial \rho_n}{\partial x} & \frac{\partial \rho_n}{\partial y} & \frac{\partial \rho_n}{\partial z} & c & -\dot{\rho}_n \end{bmatrix} \begin{bmatrix} x \\ y \\ z \\ t_c \\ t_s \end{bmatrix}$$

$$= H\underline{x}$$

where: u is a vector of pseudorange residuals (the difference between the expected pseudoranges and the actual pseudoranges); and the H matrix contains the well known line-of-sight vectors (first three columns) relating the position updates (x,y,z) to the pseudorange residuals; a well known column of constants (c the speed of light) relating the local clock bias ($t_c$) to the pseudorange residuals; and a column of range rates relating the time-of-day error ($t_s$) to the pseudorange residuals. For a detailed understanding of the above-described mathematical model, the reader is referred to U.S. Pat. No. 6,734,821, referenced above. Several iterations of the above-described mathematical model may be executed to converge on a position. The method 1000 ends at step 1020.

Use of the long term satellite tracking data to compute position obviates the need to decode ephemeris at the remote receiver from the satellite navigation stream for each satellite to which a pseudorange is determined. Since ephemeris does not have to be decoded, the cold start speed of the remote receiver is increased, particularly if satellite signals are weak and/or intermittent. Moreover, the method 1000 is performed without the need of an initial position or precise time from the network, which allows the method 1000 to be performed when the remote receiver outside the service area of the network. The position computed using the method 1000 may be stored and used as a position estimate to compute acquisition assistance data in the next position location computation, as described above with respect to FIG. 8.

Figure 11:
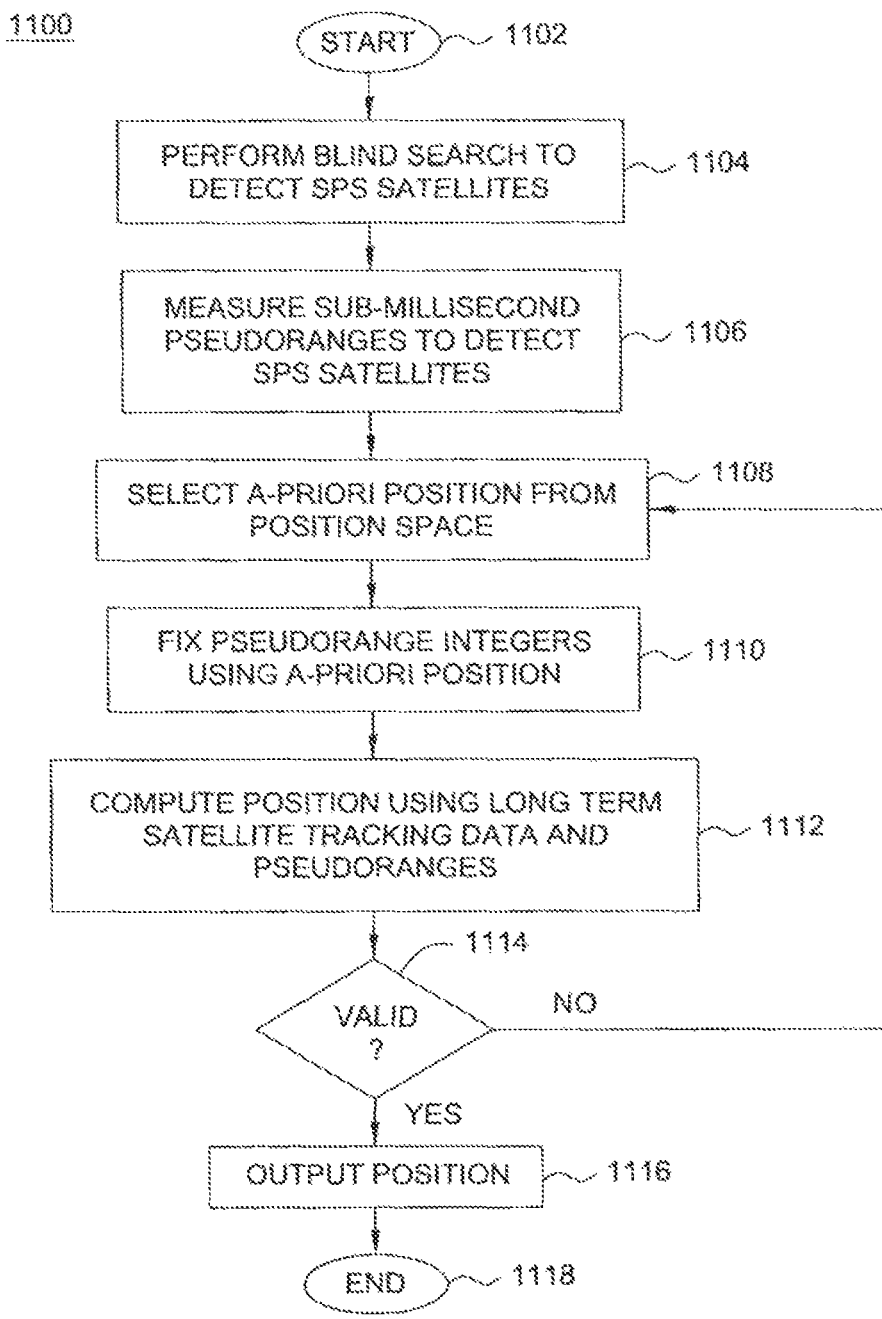
FIG. 11 is a flow diagram depicting yet another exemplary embodiment of a method for locating position of a remote receiver using a blind search technique in accordance with the invention.

FIG. 11 is a flow diagram depicting yet another exemplary embodiment of a method 1100 for locating position of a remote receiver using a blind search technique in accordance with the invention. Again, the method 1100 may be performed without obtaining an initial position estimate at the remote receiver from the network. The method 1100 begins at step 1102. At step 1104, a blind search is performed to detect SPS satellites. At step 1106, sub-millisecond pseudoranges are determined to the detected SPS satellites. At step 1108, an a-priori position of the remote receiver is selected from a space of all possible positions. Notably, the space of all possible a-priori positions may be segmented, such as being divided into a 100 km×100 km latitude-longitude grid, with altitude assigned from a look-up table of topographical altitudes. At step 1110, the integer portions of the sub-millisecond pseudoranges are fixed based on the a-priori position estimate. The integer portions may be fixed using a process similar to that performed in step 1012 of the method 1000 described above with respect to FIG. 10.

At step 1112, position of the remote receiver is computed using long term satellite tracking data stored in the remote receiver and the full pseudoranges. The position may be computed using conventional navigation equations (if precise time is available) or a time-free navigation model, as described above with respect to FIG. 10. At step 1114, a determination is made as to whether the computed position is valid. The validity of the computed position may be estimated as described above with respect to step 818 of the method 800. If not, the method 1100 returns to step 1108, where another a-priori position is selected from the space of possible positions. Otherwise, the method 1100 proceeds to step 1116. At step 1116, the computed position is output. The method 1100 ends at step 1118. The position output using the method 1100 may be stored and used as a position estimate to compute acquisition assistance data in the next position location computation, as described above with respect to FIG. 8.

In the preceding discussion, the invention has been described with reference to application upon the United States Global Positioning System (GPS). It should be evident, however, that these methods are equally applicable to similar satellite systems, and in particular, the Russian Glonass system, the European Galileo system, and the like, or any combination of the Glonass system, the Galileo system, and the GPS system. The term "GPS" used herein includes such alternative satellite positioning systems, including the Russian Glonass system and the European Galileo system.

Although the methods and apparatus of the invention have been described with reference to GPS satellites, it will be appreciated that the teachings are equally applicable to positioning systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

While the foregoing is directed to embodiments of the present invention, other and further embodiments of the invention may be devised without departing from the basic scope thereof, and the scope thereof is determined by the claims that follow.

The invention claimed is:

1. An apparatus, comprising:
    a memory configured to store satellite tracking data received from a server, the satellite tracking data having a predetermined validity time period;
    a satellite signal receiver configured to receive ephemeris data from a satellite positioning system (SPS) satellite; and
    a processor configured to, when a connection between the apparatus and the server is unavailable and the predetermined validity time period has expired, calculate acquisition assistance data using the satellite tracking data and compute a position of the apparatus by decoding the ephemeris data received from the SPS satellite using the acquisition assistance data.

2. The apparatus of claim 1, wherein the processor is configured to, when the connection between the apparatus and the server is available and the predetermined validity time period has expired, acquire updated satellite tracking data from the server and compute the position of the apparatus based on the updated satellite tracking data.

3. The apparatus of claim 1, wherein the processor is configured to, when the predetermined validity time period has expired, compute the position of the apparatus based on the stored satellite tracking data.

4. The apparatus of claim 1, wherein the memory is further configured to store the acquisition assistance data calculated by the processor, and wherein the satellite signal receiver is configured to receive the ephemeris data from the SPS satellite using the stored acquisition assistance data.

5. The apparatus of claim 4, wherein the processor is configured to compute the acquisition assistance data using a calculated time of day, a position estimate of the apparatus, and the stored satellite tracking data.

6. The apparatus of claim 5, wherein the memory is configured to store a table of positions corresponding to recent positions of the apparatus based on communications with other devices, and
wherein the position estimate of the apparatus is calculated based on the stored table of positions.

7. The apparatus of claim 4, wherein the stored acquisition assistance data was calculated based on the stored satellite tracking data whose predetermined validity time period had expired.

8. A method of determining a position of a remote device, comprising:
receiving satellite tracking data from a server, the satellite tracking data having a predetermined validity time period;
receiving ephemeris data from a satellite positioning system (SPS) satellite;
determining whether a connection between the remote device and the server is available;
determining whether the predetermined validity time period has expired; and
when the connection is unavailable and the predetermined validity time period has expired, calculating acquisition assistance data based on the satellite tracking data and computing a position of the remote device by decoding the ephemeris data received from the SPS satellite using the calculated acquisition assistance data.

9. The method of claim 8, further comprising when the connection is available and the predetermined validity time period has expired:
acquiring updated satellite tracking data from the server; and
computing the position of the remote device based on the updated satellite tracking data.

10. The method of claim 8, further comprising when the predetermined validity time period has expired, computing the position of the remote device based on the stored satellite tracking data.

11. The method of claim 8, further comprising storing the acquisition assistance data,
wherein the ephemeris data is received from the SPS satellite using the computed acquisition assistance data.

12. The method of claim 11, wherein the acquisition assistance data is calculated using a calculated time of day, a position estimate of the remote device, and the stored satellite tracking data.

13. The method of claim 12, further comprising storing a table of positions corresponding to recent positions of the remote device based on communications with other devices,
wherein the position estimate of the remote device is calculated based on the stored table of positions.

14. The method of claim 11, wherein the calculating of the acquisition assistance data is based on the stored satellite tracking data whose predetermined validity time period has expired.

15. A method of determining a position of a remote device, comprising:
receiving satellite tracking data from a server;
receiving ephemeris data from a plurality of satellite positioning system (SPS) satellites;
determining whether a connection between the remote device and the server is available;
determining whether the received satellite tracking data is valid; and
calculating a position of the remote device based on the satellite tracking data or the ephemeris data depending on whether the connection between the remote device and the server is available and whether the received satellite tracking data is valid.

16. The method of claim 15, wherein the position is calculated based on the satellite tracking data provided that the satellite tracking data is determined to be valid.

17. The method of claim 15, wherein the position is calculated based on the ephemeris data provided that the satellite tracking data is determined to be invalid and the connection between the remote device and the server is determined to be unavailable.

18. The method of claim 15, further comprising:
if it is determined that the satellite tracking data is invalid and that the connection between the remote device and the server is available:
receiving updated satellite tracking data from the server; and
calculating the position based on the updated satellite tracking data.

19. The method of claim 15, further comprising calculating acquisition assistance data,
wherein the ephemeris data is received from the SPS satellite using the acquisition assistance data.

20. The method of claim 19, wherein it is determined that the satellite tracking data is expired, and
the acquisition assistance data is calculated using the expired satellite tracking data.

* * * * *

UNITED STATES PATENT AND TRADEMARK OFFICE
CERTIFICATE OF CORRECTION

| | | |
|---|---|---|
| PATENT NO. | : 8,643,541 B2 | |
| APPLICATION NO. | : 13/418060 | |
| DATED | : February 4, 2014 | |
| INVENTOR(S) | : Van Diggelen et al. | |

It is certified that error appears in the above-identified patent and that said Letters Patent is hereby corrected as shown below:

Title page, Item (73), replace "Broadcom Corporation" with --Global Locate, Inc.--.
Title page, Item (57), replace "the predetermine validity time period" with --the predetermined validity time period--.

Signed and Sealed this
Twenty-fourth Day of June, 2014

Michelle K. Lee
*Deputy Director of the United States Patent and Trademark Office*